(12) United States Patent
Niinuma et al.

(10) Patent No.: US 11,900,298 B2
(45) Date of Patent: Feb. 13, 2024

(54) PROCESSING DEVICE, PROCESSING METHOD, AND STORAGE MEDIUM FOR PREDICTING PERFORMANCE OF A PRODUCTION PLAN

(71) Applicant: KABUSHIKI KAISHA TOSHIBA, Tokyo (JP)

(72) Inventors: Ayumu Niinuma, Yokohama (JP); Hirotomo Oshima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 33 days.

(21) Appl. No.: 17/408,696

(22) Filed: Aug. 23, 2021

(65) Prior Publication Data

US 2022/0188734 A1 Jun. 16, 2022

(30) Foreign Application Priority Data

Dec. 14, 2020 (JP) ................. 2020-206739

(51) Int. Cl.
*G06Q 10/0639* (2023.01)
*G06Q 10/20* (2023.01)
(Continued)

(52) U.S. Cl.
CPC ......... *G06Q 10/06395* (2013.01); *G06N 3/08* (2013.01); *G06Q 10/06313* (2013.01);
(Continued)

(58) Field of Classification Search
CPC ........... G06Q 10/00–50/00; G06N 3/00–20/00
(Continued)

(56) References Cited

U.S. PATENT DOCUMENTS 5,231,567 A * 7/1993 Matoba ............ G05B 19/41865
700/100
5,479,343 A * 12/1995 Matoba .................. G06Q 10/06
700/106
(Continued)

FOREIGN PATENT DOCUMENTS

| JP | 2000-77289 A | 3/2000 |
| JP | 2020-500420 A | 1/2020 |
| JP | 2020-149466 A | 9/2020 |

OTHER PUBLICATIONS

Vieira, Guilherme E., Jeffrey W. Herrmann, and Edward Lin. "Predicting the performance of rescheduling strategies for parallel machine systems." Journal of manufacturing Systems 19.4 (2000): 256-266. (Year: 2000).*

(Continued)

*Primary Examiner* — Alan S Miller
(74) *Attorney, Agent, or Firm* — Oblon, McClelland, Maier & Neustadt, L.L.P.

(57) ABSTRACT

According to one embodiment, a processing device refers to data sets. Each of the data sets includes previous plan data and performance data. The previous plan data are of a time series of a relationship between time and a target production volume of a previous plan. The device calculates first evaluation values for sets of the performance data. The new plan data are of a time series of a relationship between time and a target production volume of a new plan. The device inputs a new plan image to a first model and calculates second evaluation values for the sets of performance data. The new plan image is of the relationship between time and the target production volume of the new plan. The device extracts at least one of the sets of performance data by using the first evaluation values and the second evaluation values.

12 Claims, 11 Drawing Sheets

(51) Int. Cl.
*G06N 3/08* (2023.01)
*G06Q 50/04* (2012.01)
*G06Q 10/0631* (2023.01)
*G06Q 10/0637* (2023.01)

(52) U.S. Cl.
CPC ....... *G06Q 10/06375* (2013.01); *G06Q 10/20* (2013.01); *G06Q 50/04* (2013.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 5,586,021 | A | * | 12/1996 | Fargher .............. G06Q 10/0631 700/121 |
| 5,657,453 | A | * | 8/1997 | Taoka .............. G05B 19/41865 705/28 |
| 6,434,440 | B1 | | 8/2002 | Teranishi et al. |
| 7,693,593 | B2 | * | 4/2010 | Ishibashi ................ G06Q 10/04 700/52 |
| 2007/0244591 | A1 | * | 10/2007 | Ishibashi ................ G06Q 10/06 700/99 |
| 2019/0286983 | A1 | | 9/2019 | Jung et al. |
| 2020/0293018 | A1 | | 9/2020 | Tsunoo et al. |
| 2022/0152901 | A1 | * | 5/2022 | Minowa .................. B29C 45/76 |

OTHER PUBLICATIONS

Ha, Chunghun, Hyesung Seok, and Changsoo Ok. "Evaluation of forecasting methods in aggregate production planning: A Cumulative Absolute Forecast Error (CAFE)." Computers & Industrial Engineering 118 (2018): 329-339. (Year: 2018).*

* cited by examiner

PROCESSING DEVICE, PROCESSING METHOD, AND STORAGE MEDIUM FOR PREDICTING PERFORMANCE OF A PRODUCTION PLAN

CROSS-REFERENCE TO RELATED APPLICATIONS

This application is based upon and claims the benefit of priority from Japanese Patent Application No. 2020-206739, filed on Dec. 14, 2020; the entire contents of which are incorporated herein by reference.

FIELD

Embodiments described herein relate generally to a processing device, a processing method, and a storage medium.

BACKGROUND

A production plan is pre-generated when producing a product. It is desirable to develop technology that can provide a user with data that is useful for generating the production plan.

DETAILED DESCRIPTION

Figure 1:
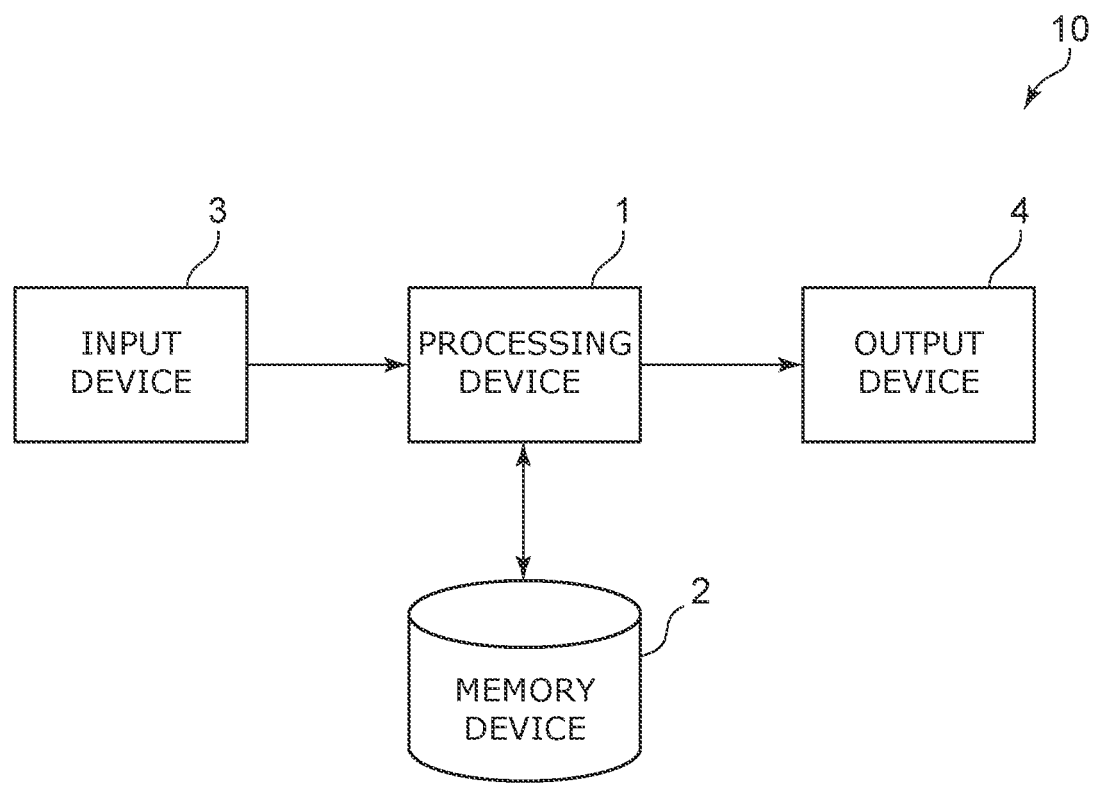
FIG. 1 is a schematic view illustrating a processing system according to an embodiment.

According to one embodiment, a processing device refers to a plurality of data sets. Each of the data sets includes previous plan data and performance data. The previous plan data are of a time series of a relationship between time and a target production volume of a previous plan. The performance data are of performance with respect to the previous plan. The device calculates a plurality of first evaluation values for a plurality of sets of the performance data by using distances between new plan data and each of a plurality of sets of the previous plan data. The new plan data are of a time series of a relationship between time and a target production volume of a new plan. The first evaluation values are of an evaluation as a prediction of performance with respect to the new plan data. The device inputs a new plan image to a first model and calculates a plurality of second evaluation values for the sets of performance data by using a classification result of the new plan image output from the first model. The new plan image is of the relationship between time and the target production volume of the new plan. The second evaluation values are of an evaluation as a prediction of the performance with respect to the new plan data. The device extracts at least one of the sets of performance data by using the first evaluation values and the second evaluation values.

Various embodiments are described below with reference to the accompanying drawings. In the specification and drawings, components similar to those described previously or illustrated in an antecedent drawing are marked with like reference numerals, and a detailed description is omitted as appropriate.

FIG. 1 is a schematic view illustrating a processing system according to an embodiment.

FIGS. 2A to 4D are schematic views for describing processing according to the processing system according to the embodiment.

The processing system 10 according to the embodiment provides a user with data that can be utilized in a prediction of performance relating to a new production plan. The processing system 10 includes a processing device 1, a memory device 2, an input device 3, and an output device 4.

The memory device 2 stores a data set that includes previous plan data and performance data for the previous plan data. The previous plan data is time-series data of the relationship between time and the target production volume at each time of a previous plan for some product. The performance data is time-series data of the relationship between time and the actual volume produced (the actual production volume) at each time for the product. For example, the previous plan data is of the relationship between dates and the target production volume of the product at each date. The performance data is of the relationship between dates and the actual production volume of the product at each date.

The memory device 2 stores multiple data sets. The products that are the objects of the plans and performance may be the same or different from each other between the data sets.

FIGS. 2A to 2D are examples of previous plan data. The previous plan data A1 to D1 of FIGS. 2A to 2D respectively show the plans of the production of products A to D. FIGS. 2E to 2H are examples of performance data. The performance data A2 to D2 of FIGS. 2E to 2H respectively show the performance with respect to the previous plan data A1 to D1 of FIGS. 2A to 2D. In FIGS. 2A to 2H, the horizontal axis is time; and the vertical axis is the production volume.

Figure 2A:
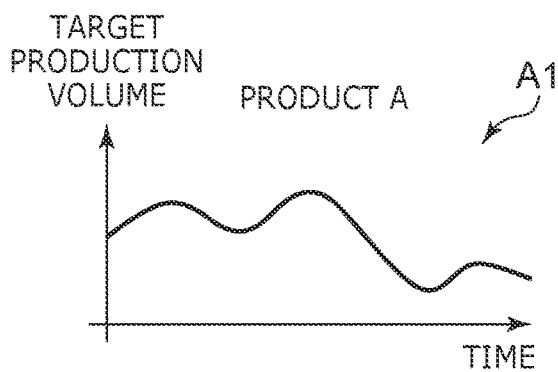
FIGS. 2A to 2H are schematic views for describing processing according to the processing system according to the embodiment.
Figure 2E:
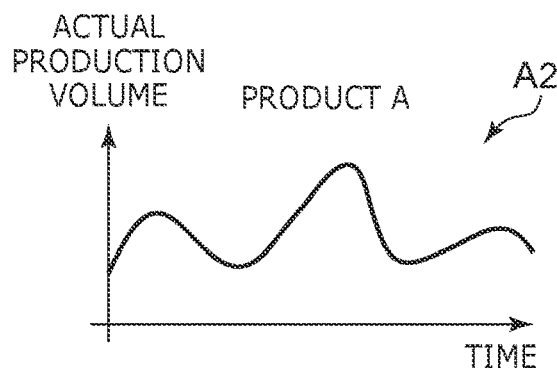
Figure 2B:
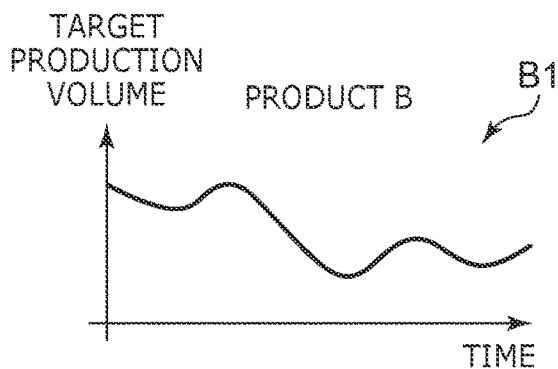
Figure 2F:
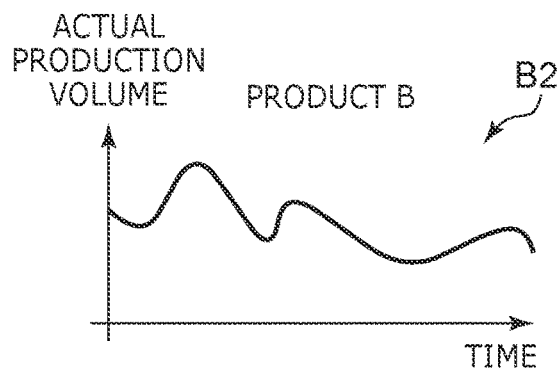
Figure 2C:
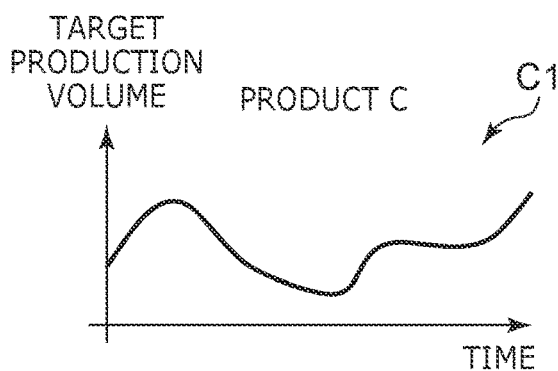
Figure 2G:
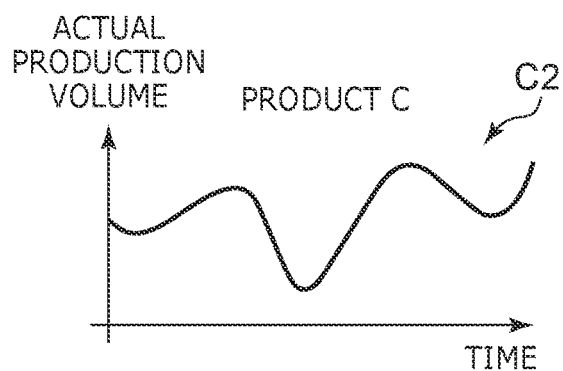
Figure 2D:
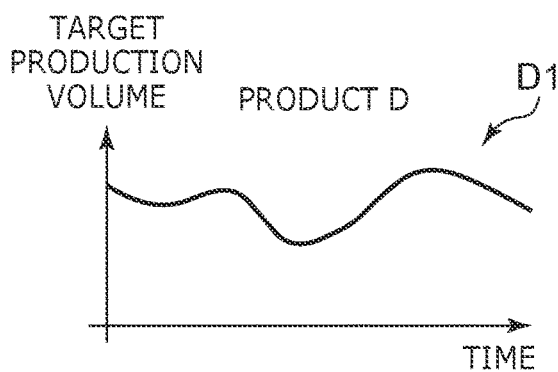
Figure 2H:
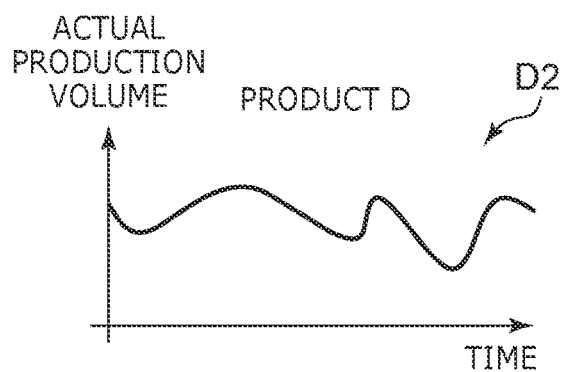

A data set that includes the previous plan data A1 of FIG. 2A and the performance data A2 of FIG. 2E is stored in the memory device 2. Similarly, a data set of the previous plan data B1 of FIG. 2B and the performance data B2 of FIG. 2F, a data set of the previous plan data C1 of FIG. 2C and the performance data C2 of FIG. 2G, and a data set of the previous plan data D1 of FIG. 2D and the performance data D2 of FIG. 2H are stored in the memory device 2.

The processing device 1 acquires new plan data. The new plan data is time-series data of the relationship between time and the target production volume at each time of a new plan for any product. For example, the new plan data is of the relationship between future dates and the target production volume of the product at each date. The product that is the object of the new plan may be the same as or different from the products that are the objects of the previous plans and performance.

The user uses the input device 3 to input data to the processing device 1. The data that is transmitted from the processing device 1 is output by the output device 4 toward the user. For example, the user uses the input device 3 to input the new plan data to the processing device 1. The new plan data is stored in the memory device 2; and the processing device 1 may acquire the new plan data from the memory device 2.

Figure 3A:
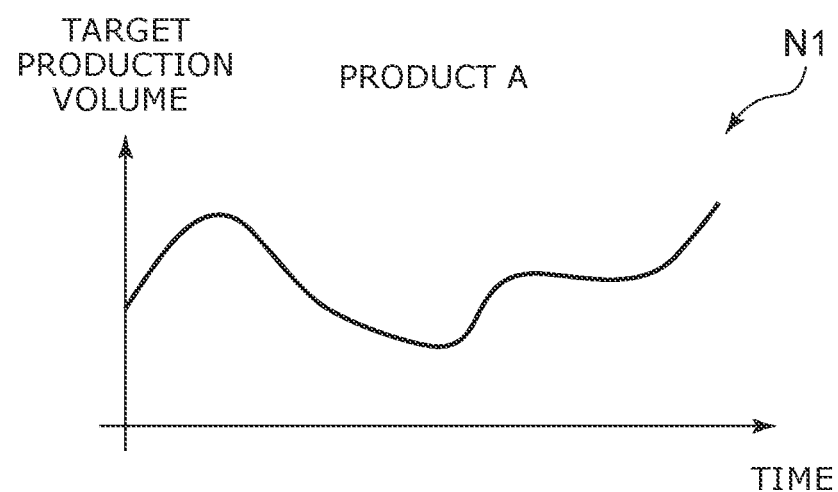
FIGS. 3A and 3B are schematic views for describing processing according to the processing system according to the embodiment.

FIG. 3A is an example of new plan data. The new plan data N1 of FIG. 3A shows the plan of the production of the product A. In FIG. 3A, the horizontal axis is time; and the vertical axis is the production volume.

The processing device 1 extracts performance data that can be utilized as a prediction of the performance with respect to the new plan from the multiple data sets. The processing device 1 extracts by executing the following first processing and second processing.

In the first processing, the processing device 1 calculates the distances between the new plan data and the multiple sets of previous plan data. The processing device 1 calculates the multiple first evaluation values of an evaluation as a prediction of the performance with respect to the new plan data for the multiple sets of performance data by using the calculated multiple distances.

For example, the processing device 1 calculates the distances between the new plan data N1 of FIG. 3A and the multiple sets of previous plan data A1 to D1 of FIGS. 2A to 2D. The distance decreases as the similarity of the form of the change of the target production volume with respect to time increases. The performance data for the previous plan data for which the distance is obtained becomes more suitable to predict the performance with respect to the new plan data as the distance decreases.

The processing device 1 generates a ranking by arranging the multiple sets of performance data in order from the shortest distance for the multiple distances of the multiple sets of previous plan data. The ranking of the performance data corresponding to the previous plan data is higher as the distance for the previous plan data decreases. The processing device 1 calculates the first evaluation values of the performance data according to the order of the ranking.

A Euclidean distance, a Manhattan distance, a Chebyshev distance, a distance calculated by dynamic time warping (DTW), etc., can be used as the distance.

Figure 3B:
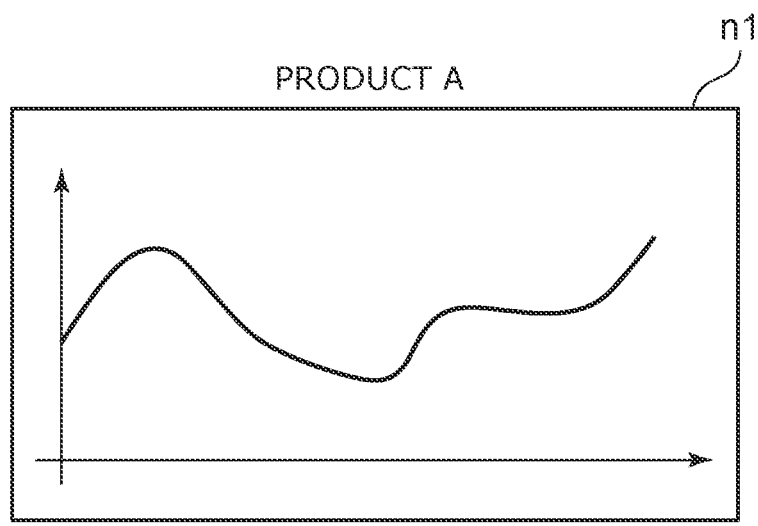
Figure 4A:
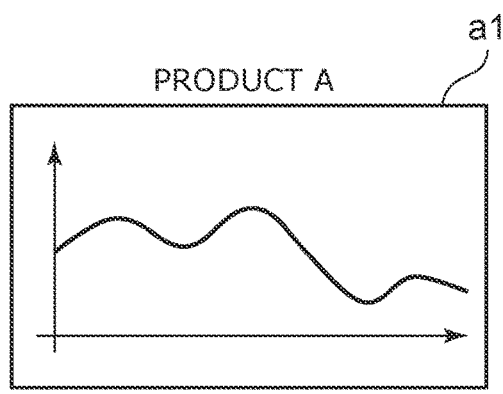
FIGS. 4A to 4D are schematic views for describing processing according to the processing system according to the embodiment.
Figure 4B:
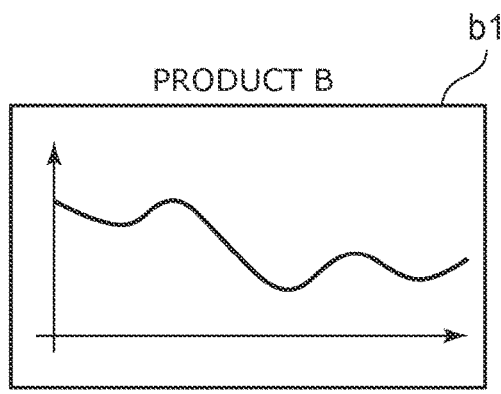
Figure 4C:
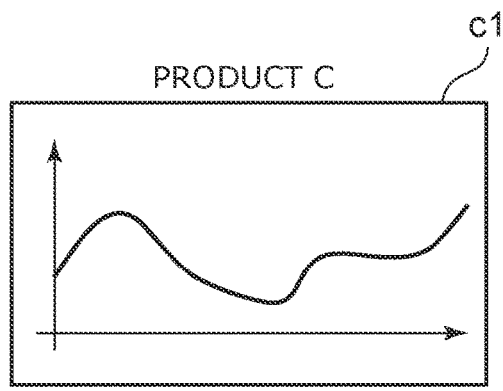
Figure 4D:
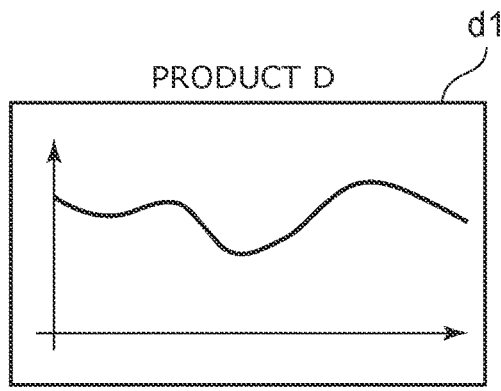

In the second processing, the processing device 1 uses the new plan image and a first model. The new plan image is image data of the relationship between time and the target production volume of the new plan. FIG. 3B is an example of a new plan image. The new plan image n1 of FIG. 3B is image data corresponding to the new plan data N1 of FIG. 3A.

In the example, the image of a chart in which the horizontal axis is time and the vertical axis is the production volume is used as the new plan image n1. The content shown in the image is arbitrary as long as the relationship between time and the target production volume is shown. For example, the image may be a scatter plot showing the relationship between time and the production volume.

The user uses the input device 3 to input the new plan image to the processing device 1. Or, the processing device 1 may generate the new plan image based on the new plan data.

The first model outputs a classification result according to the input of the plan image. The first model includes, for example, a neural network, a model trained by a random forest, a model trained by a decision tree, or a model trained by a support vector machine. It is favorable for the first model to include a convolutional neural network (CNN). Each of the multiple sets of performance data are classified as some class. The classification result includes the probability of the plan image being classified as each of the multiple classes.

The first model is pretrained using a previous plan image. The previous plan image is image data of the relationship between time and the target production volume of the previous plan for some product.

FIGS. 4A to 4D are examples of previous plan images. The previous plan images a1 to d1 of FIGS. 4A to 4D correspond respectively to the previous plan data A1 to D1 of FIGS. 2A to 2D and show plans of the production of the products A to D. In the example, the image of a chart in which the horizontal axis is time and the vertical axis is the production volume is used as the previous plan image. The performance data A2 to D2 of FIGS. 2E to 2H respectively show the performance with respect to the previous plans of the previous plan images a1 to d1.

The first model is trained by using the previous plan image as input data and by using a value of the class of the performance data as a label. For example, the first model is trained by using the previous plan image a1 of FIG. 4A as input data and by using a value of a class that includes the performance data A2 of FIG. 2E as a label. Thereby, the first model is trained so that the image is classified as some class when the plan image is input.

The class is set according to the form of the change of the target production volume with respect to time. For example, the same class is set for previous plans that have similar forms of the change of the target production volume with respect to time regardless of the target production volume and the production period.

The processing device 1 inputs the new plan image to the first model and acquires a classification result output from the first model. The processing device 1 uses the classification result to calculate a second evaluation value for each set of performance data. The second evaluation value is of an evaluation as a prediction of the performance with respect to the new plan data of the new plan image for the performance data.

For example, the processing device 1 generates a ranking by arranging the classes in order from highest probability. As the probability increases, the likelihood of the performance data classified as each class being similar to the performance of the new plan increases, and the performance data is suitable as a prediction of the performance. The processing device 1 calculates the second evaluation value of the performance data classified as each class according to the order of the ranking.

The processing device 1 calculates the score of each set of performance data by using the first and second evaluation values. For example, the processing device 1 uses the sum of the first evaluation value and the second evaluation value, the product of the first evaluation value and the second evaluation value, or the average of the first evaluation value and the second evaluation value as the score. The processing device 1 may use a weighted sum of the first evaluation value and the second evaluation value as the score.

For example, the processing device 1 calculates a weight for each set of performance data. The weight for the performance data can be set based on the time difference between the start time of the new plan and the start time of the previous plan forming the basis of the performance data. It is considered that the performance data is more suitable as a prediction of the performance with respect to the new plan as the time difference decreases. The processing device 1 sets the weight to increase as the time difference decreases.

The weight for the performance data may be set based on the difference between the total amount of the target production volume of the new plan and the total amount of the target production volume of the previous plan forming the basis of the performance data. It is considered that the suitability of the performance data increases as the production volume difference decreases. The processing device 1 sets the weight to increase as the production volume difference decreases. The total amount of the production volume can be calculated by summing the production volume at each time for the production period from the start time to the end time.

Or, the weight for the performance data may be set based on the difference between the length of the production period of the new plan and the length of the production period of the previous plan forming the basis of the performance data. It is considered that the suitability of the performance data increases as the production period difference decreases. The processing device 1 sets the weight to increase as the production period difference decreases.

The processing device 1 extracts one set of performance data from the multiple sets of performance data based on the score. When a higher score indicates that the performance data is more suitable, the processing device 1 extracts the performance data having the highest score. The processing device 1 may extract two or more sets of performance data in order from the highest score. The processing device 1 stores the extracted performance data in the memory device 2. The processing device 1 may output the extracted performance data to the output device 4.

The processing device 1 may generate first prediction data by correcting the production period and the production volume of the extracted performance data. The production period and the production volume can be corrected by the following method.

The processing device 1 calculates the ratio of the production period of the performance data to the production period of the previous plan forming the basis of the performance data. The processing device 1 calculates the production period of the first prediction data by multiplying the ratio by the production period of the new plan. The processing device 1 sets the start time of the first prediction data to be the start time of the new plan. The processing device 1 sets the end time of the first prediction data by adding the calculated production period to the start time of the new plan.

The processing device 1 calculates the ratio of the total amount of the actual production volume of the performance data to the total amount of the target production volume of the previous plan forming the basis of the performance data. The processing device 1 calculates the production volume of the first prediction data by multiplying the ratio by the target production volume at each time of the new plan.

The processing device 1 stores the first prediction data in the memory device 2. The processing device 1 may output the first prediction data to the output device 4.

FIGS. 5A and 5B, FIG. 6, and FIGS. 7A and 7B are schematic views illustrating processing results according to the processing system according to the embodiment.

The processing device 1 may output the processing results as illustrated in FIGS. 5A and 5B, FIG. 6, and FIGS. 7A and 7B. The output method is arbitrary and may be a display by a monitor, a projection by a projector, printing by a printer, etc.

Figure 5A:
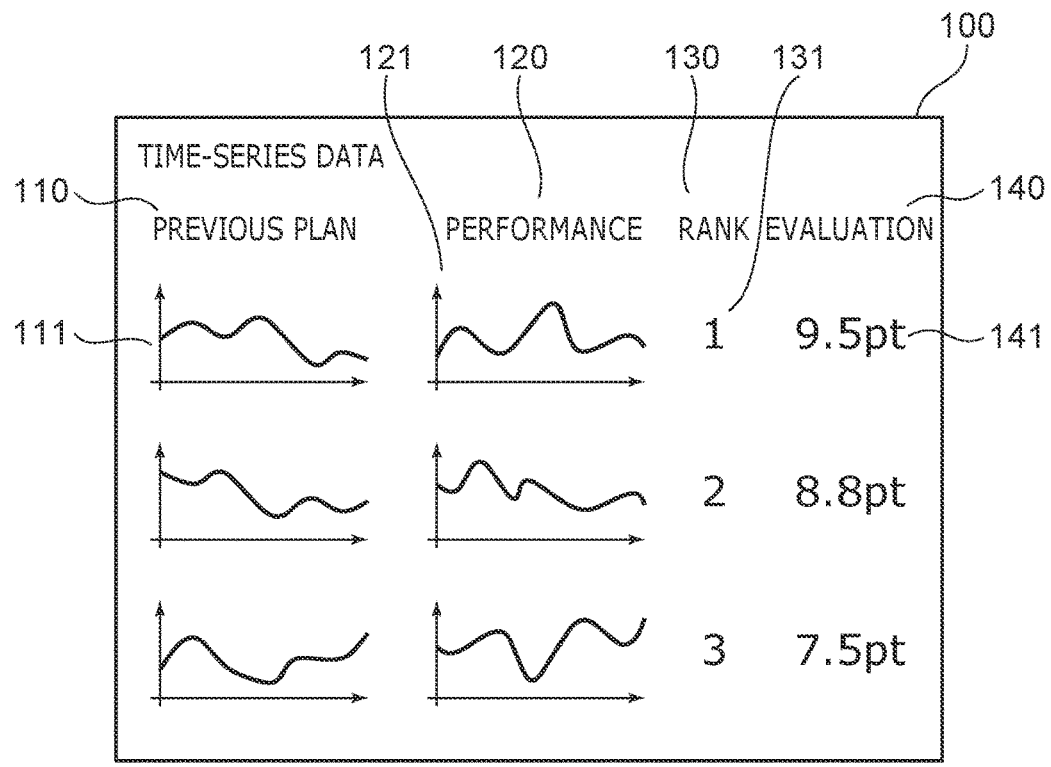
FIGS. 5A and 5B are schematic views illustrating processing results according to the processing system according to the embodiment.

A processing result 100 of FIG. 5A illustrates a result obtained by the first processing. In the processing result 100, one or more sets of previous plan data 111 of previous plans are displayed in a previous plan 110 column. One or more sets of performance data 121 of the performance with respect to the previous plans are displayed in a performance 120 column. The previous plan data 111 and the performance data 121 are displayed in a chart that the user can easily understand. The number of sets of the previous plan data 111 displayed in the previous plan 110 column and the number of sets of the performance data 121 displayed in the performance 120 column can be appropriately set by the user. Ranks 131 of each set of performance data when the performance data are ranked based on the first evaluation values are displayed in the rank 130 column. First evaluation values 141 in which each set of performance data is multiplied by the weight are displayed in an evaluation 140 column.

Figure 5B:
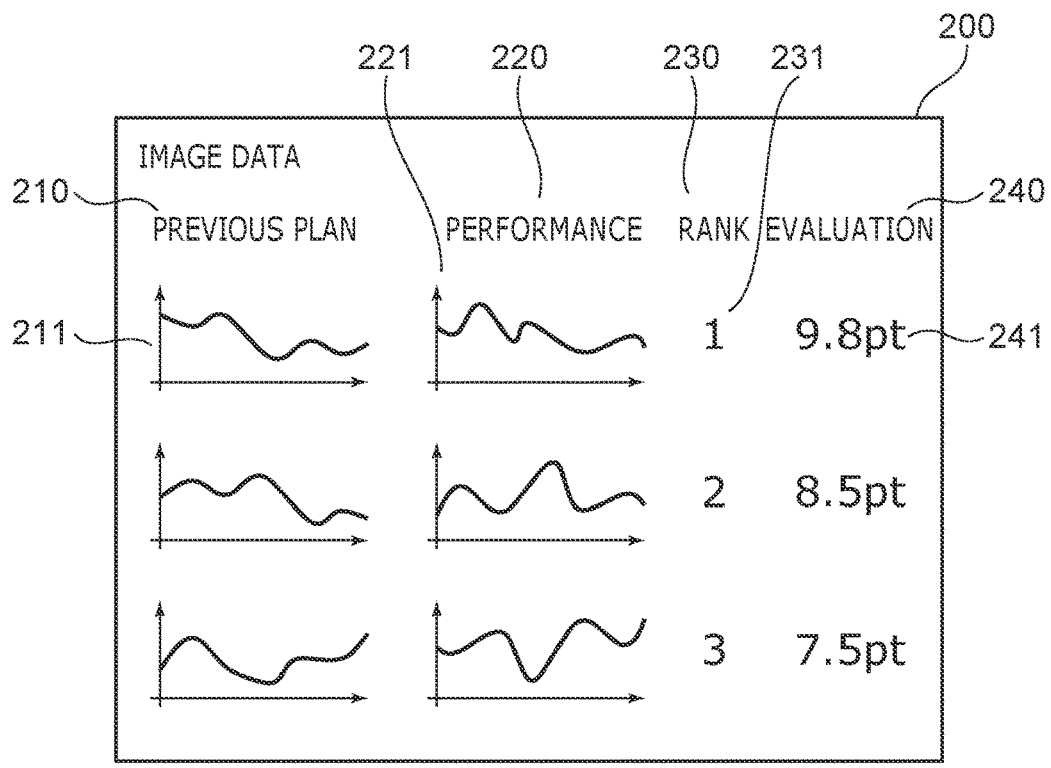

A processing result 200 of FIG. 5B illustrates a result obtained by the second processing. In the processing result 200, one or more previous plan images 211 of the previous plans are displayed in a previous plan 210 column. One or more sets of performance data 221 of the performance with respect to the previous plans are displayed in a performance 220 column. The number of the previous plan images 211 displayed in the previous plan 210 column and the number of sets of the performance data 221 displayed in the performance 220 column can be appropriately set by the user. Instead of the performance data, a performance image that shows the performance with respect to the previous plan may be displayed. Ranks 231 of each set of performance data when the performance data are ranked based on the second evaluation values are displayed in a rank 230 column. Second evaluation values 241 in which the weights are multiplied by each set of performance data are displayed in an evaluation 240 column.

Figure 6:
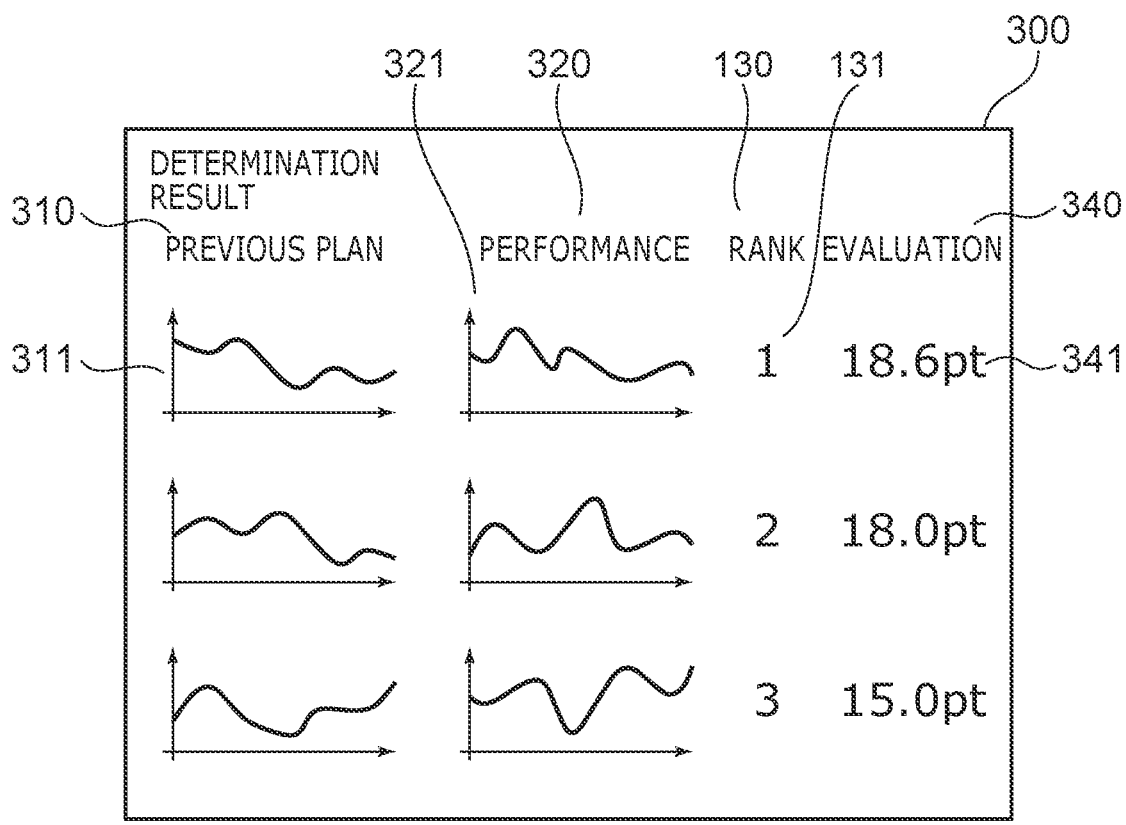
FIG. 6 is a schematic view illustrating processing results according to the processing system according to the embodiment.

The processing device 1 calculates the score by summing the weighted first and second evaluation values. FIG. 6 illustrates a determination result obtained from the processing results of the first and second processing. In the determination result 300, one or more sets of previous plan data 311 of the previous plans are displayed in a previous plan 310 column. A previous plan image may be displayed instead of the previous plan data. One or more sets of performance data 321 of the performance with respect to the previous plans are displayed in a performance 320 column. A performance image may be displayed instead of the performance data. The number of sets of the previous plan data 311 displayed in the previous plan 310 column and the number of sets of the performance data 321 displayed in the performance 320 column can be appropriately set by the user. Scores 341 that are the weighted sums of the first and second evaluation values for each set of performance data are displayed in an evaluation 340 column. Ranks 331 of each set of performance data when ranked based on the scores 341 are displayed in a rank 330 column.

Figure 7A:
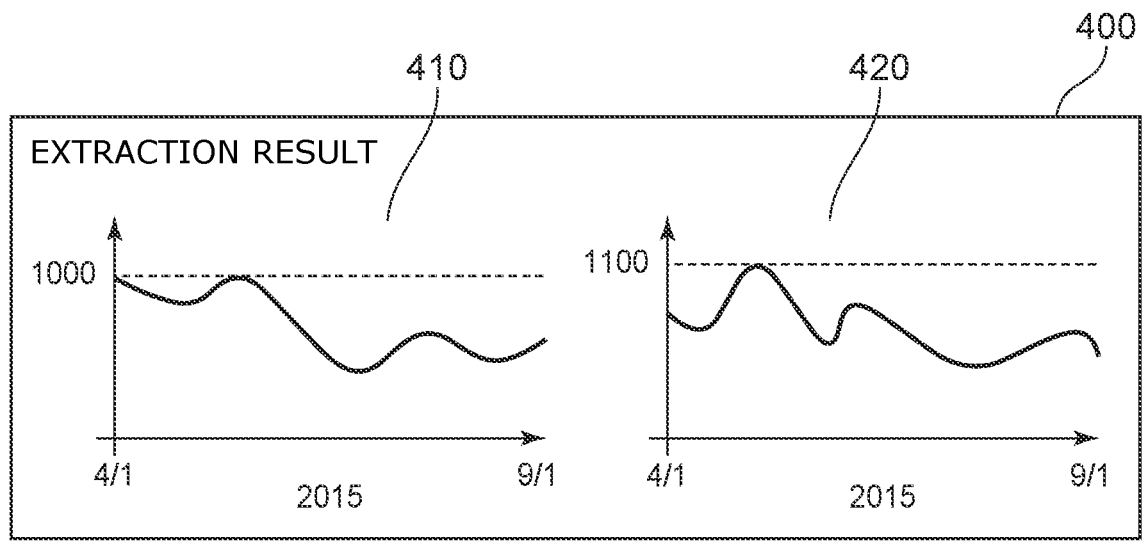
FIGS. 7A and 7B are schematic views illustrating processing results according to the processing system according to the embodiment.

For example, the processing device 1 extracts the performance data having the highest score and the previous plan data forming the basis of the performance data. FIG. 7A illustrates an extraction result 400. The extraction result 400 includes extracted performance data 420 and previous plan data 410 that forms the basis of the performance data 420. The time of the production, the production volume, etc., are specifically displayed in the previous plan data 410 and the performance data 420.

Figure 7B:
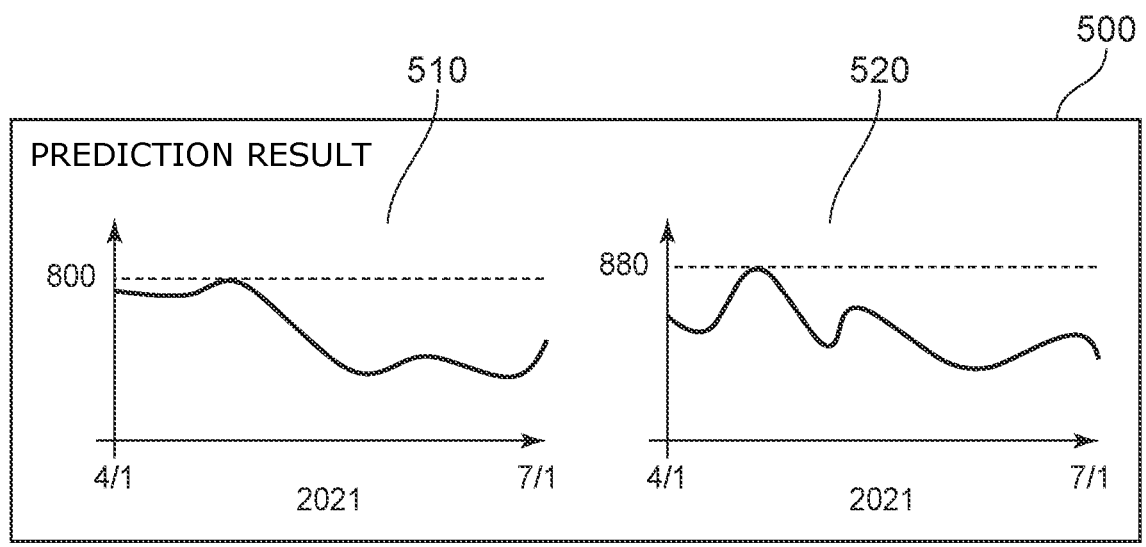

The processing device 1 generates the first prediction data based on the extraction result. FIG. 7B illustrates a prediction result 500. The prediction result 500 includes new plan data 510 and first prediction data 520. The time of the production, the production volume, etc., are specifically displayed in the new plan data 510 and the first prediction data 520. The new plan data 510 is prepared by the user and is data that is used in the first and second processing. The production period and the production volume of the first prediction data 520 are corrected using the previous plan data 410, the performance data 420, and the new plan data 510.

By confirming a first ranking in which not less than one of the multiple sets of performance data illustrated in FIG. 5A are arranged and a second ranking in which not less than one of the multiple sets of performance data illustrated in FIG. 5B are arranged, the user can easily ascertain how the processing device evaluates the performance data. By confirming the determination result of FIG. 6, the user can easily ascertain the performance data that is extracted and the scores of the performance data. By confirming the extraction result of FIG. 7A, the user can easily ascertain the data that is used in the first prediction data. By confirming the prediction result of FIG. 7B, the user can easily ascertain the prediction result of the processing device 1. For example, the user can easily determine from a comparison of FIGS. 7A and 7B whether the data that is used in the first prediction data is appropriate.

Figure 8:
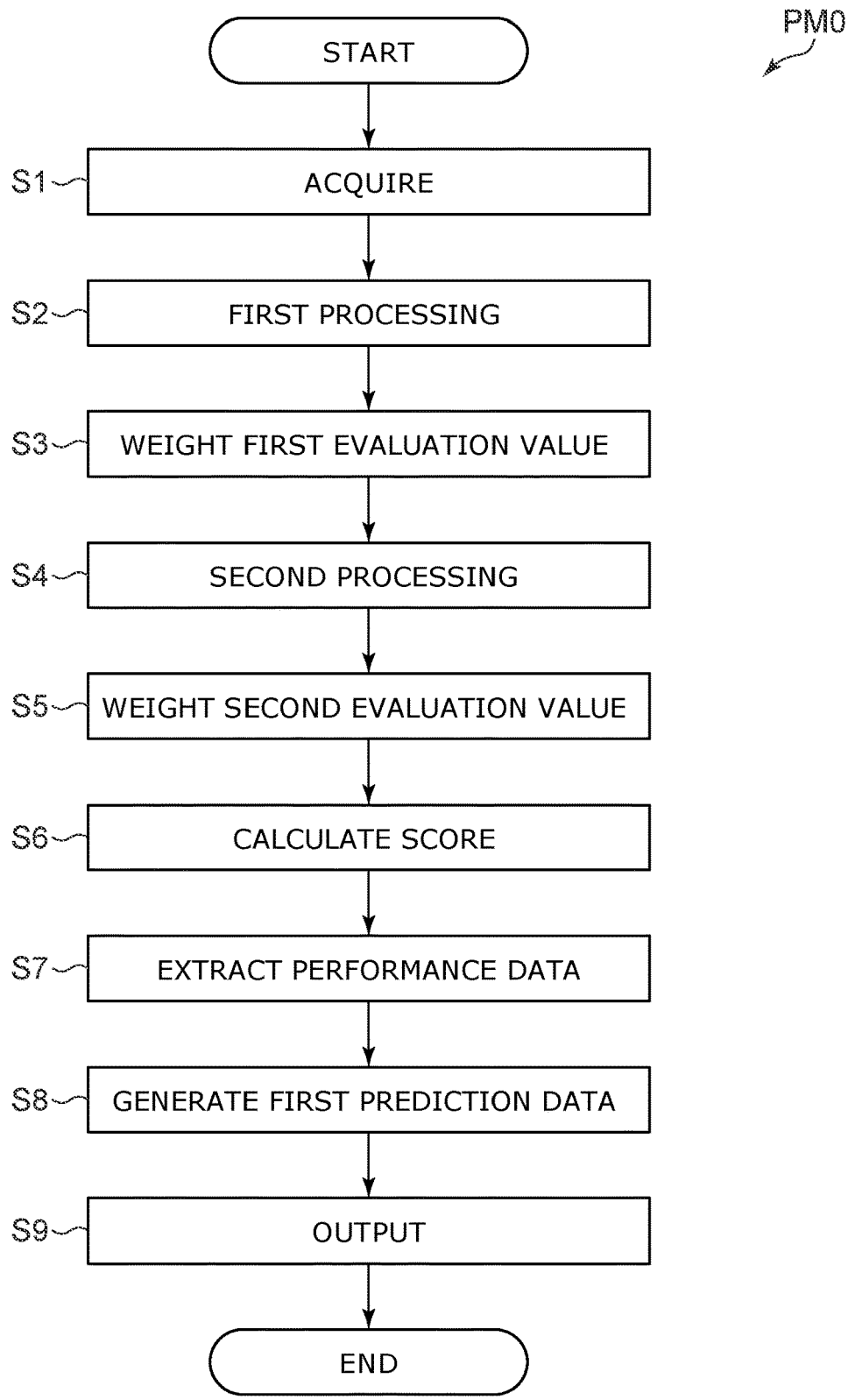
FIG. 8 is a flowchart illustrating a processing method according to the processing system according to the embodiment.

FIG. 8 is a flowchart illustrating a processing method according to the processing system according to the embodiment.

In the processing method PM0, the processing device 1 acquires the new plan data and the new plan image (step S1). The processing device 1 executes the first processing (step S2). The first evaluation value is obtained thereby. The processing device 1 weights the first evaluation value (step S3). The processing device 1 executes the second processing (step S4). The second evaluation value is obtained thereby. The processing device 1 weights the second evaluation value (step S5). The processing device 1 calculates the score by using the weighted first and second evaluation values (step S6). The processing device 1 extracts the performance data based on the score (step S7). The processing device 1 generates the first prediction data (step S8). The processing device 1 outputs the data obtained by the processing (step S9).

In the processing method PM0, the order of the processing is modifiable as appropriate. For example, steps S4 and S5 may be executed before steps S2 and S3. Steps S4 and S5 may be executed in parallel with steps S2 and S3.

Advantages of embodiments will now be described.

In the production of the product, it is desirable to more effectively utilize limited resources. By effectively utilizing resources, the production volume can be increased while using less resources; and more product types can be produced. As a result, for example, sales opportunities can be increased, and profits can be increased. On the other hand, the production volume may change over time. For example, the production volume changes according to demand fluctuation of products, product type increases due to the production of new products, etc. When the production volume changes, the necessary resources also change. To adapt to the change of the production volume, the procurement and the distribution of resources are determined by planning the future relationship between time and the target production volume. At this time, it is desirable to determine the procurement and the distribution of resources while referring to the actual manufacturing capacity. The manufacturing capacity is an index that indicates the production volume for the allocated resources. By referring to the manufacturing capacity, excessive or insufficient resources can be reduced when producing according to the plan; and the resources can be more effectively utilized.

Conventionally, the manufacturing capacity is calculated based on a rule or an optimization method that is set beforehand. However, many uncertain elements exist in the actual manufacturing capacity. Unexpected absenteeism of workers, compatibility between the products and machines, aging of machines, fluctuation of worker skills, etc., are examples of uncertain elements. As a result, it is difficult to produce according to a new plan that is predetermined. Conventionally, adaptation for these elements is performed in various ways based on skill and know-how such as modifying the personnel distribution, production adjustment of other products, etc. In other words, the knowledge, skill, experience, etc., of humans is necessary to produce products according to a new plan that is predetermined by a conventional method. Also, time is necessary in order to investigate and execute the adaptation. Therefore, it is desirable to provide technology that can reduce the dependent on the knowledge, the skill, the experience, etc., of humans and can reduce the load of making the adaptation.

For this problem, according to the embodiment, data for estimating the actual manufacturing capacity with higher accuracy is provided to the user. By referring to the data, the actual manufacturing capacity can be estimated with higher accuracy. Even when uncertain elements occur, a new plan that has a high likelihood of being executable can be generated.

Specifically, the processing system according to the embodiment extracts not less than one set of performance data that can be utilized to predict the new plan from previous multiple sets of performance data. The extracted performance data is of the performance based on a previous plan that is similar to the new plan. When the previous plan is similar to the new plan, the performance that is based on the previous plan also has a high likelihood of being similar to the performance based on the new plan. The performance data is a result in which uncertain elements have occurred in the previous plan and is of the actual manufacturing capacity. By referring to the extracted performance data, the actual manufacturing capacity can be estimated with higher accuracy.

According to embodiments, the performance data is extracted using the first and second evaluation values. The first evaluation value is calculated using the distance between the new plan data and the previous plan data. The second evaluation value is calculated using the classification result of the new plan image. By using the distance and the classification result of the image, a previous plan that is similar to the new plan can be extracted. As a result, performance data that is useful for predicting the performance with respect to the new plan can be extracted.

Figure 9:
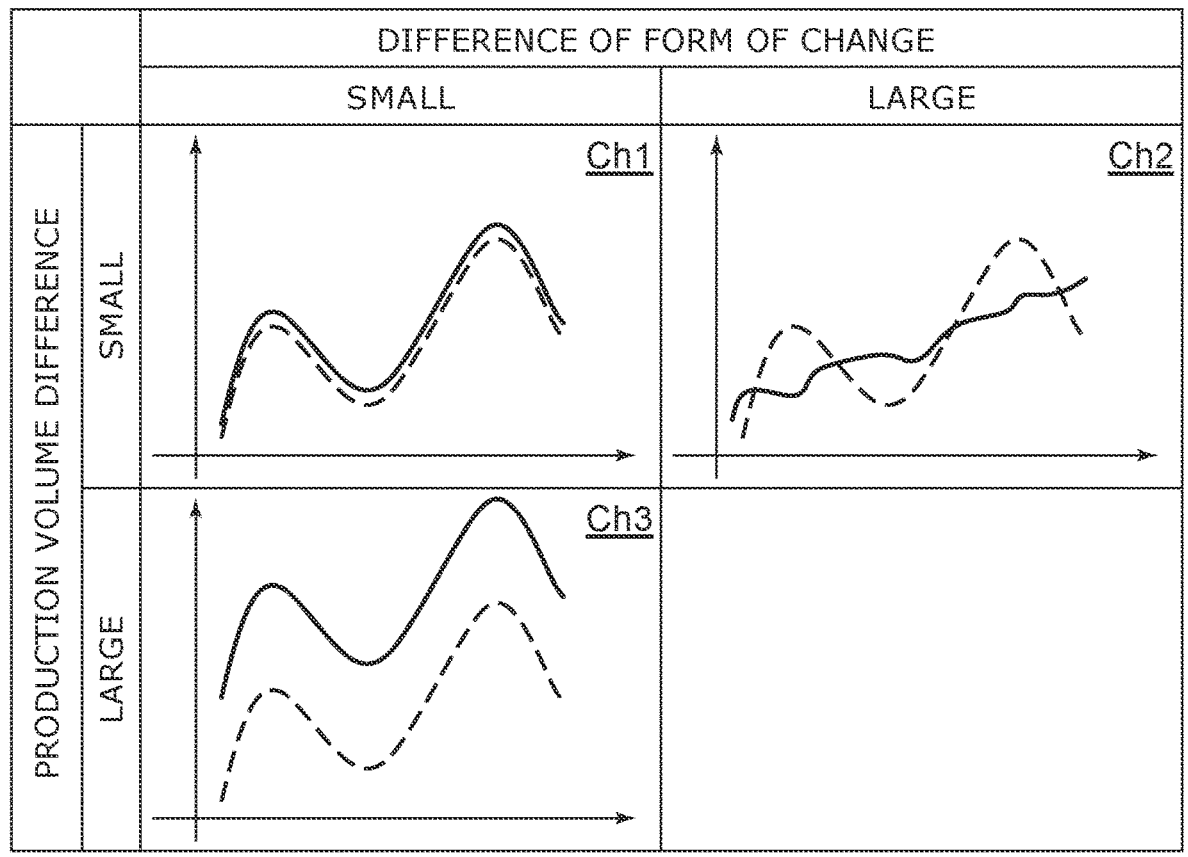
FIG. 9 is a schematic view for describing advantages of embodiments.

FIG. 9 is a schematic view for describing advantages of embodiments.

FIG. 9 illustrates multiple charts Ch1 to Ch3 showing relationships between time and the production volume. In the charts Ch1 to Ch3, the horizontal axis is time; and the vertical axis is the production volume. The solid line illustrates the new plan. The dashed line illustrates the previous plan. By using the distance, a previous plan can be extracted so that the target production volume difference at each time between the previous plan and the new plan is small as illustrated in the charts Ch1 and Ch2. On the other hand, when extracting by using the distance, it is difficult to extract a previous plan when the target production volume difference between the previous plan and the new plan is large even though the forms of the change of the target production volume with respect to time are similar. For example, the distance between the new plan and the previous plan illustrated in the chart Ch3 is greater than the distance between the new plan and the previous plan illustrated in the chart Ch2. Therefore, it is determined that the new plan of the chart Ch3 is not similar to the previous plan of the chart Ch3.

When the classification result of the image is used, the new plan is classified mainly according to the form of the change of the production volume with respect to time even when the difference between the target production volume of the new plan and the production volume of the performance data of the classified class is large. For example, even when the difference between the target production volume of the new plan and the target production volume of the previous plan is large as illustrated in the chart Ch3, the new plan is classified as the class of the performance data based on the previous plan. By using both the distance and the classification result of the image, performance data that is more useful for predicting the performance can be extracted.

It is favorable to use DTW when calculating the distance between the new plan data and the previous plan data. According to DTW, the change of the target production volume with respect to time can be compared between the new plan data and the previous plan data regardless of the length of the production period of each previous plan. Therefore, more useful performance data can be extracted.

It is favorable for the first model to include a CNN. According to a CNN, the new plan that is used as the image can be more appropriately classified. For example, the new plan can be more appropriately classified even when there are fine differences between the new plan and the previous plan used for the training and when there are abnormal values in the previous plan. In other words, the new plan can be classified as the class of the performance data based on a previous plan that has a general appearance similar to that of the new plan.

The time of one or both of the previous plan data and the performance data may be corrected. The processing device 1 shifts the time of the performance data into the past by the amount of the time necessary to produce the product. For example, the time that is necessary for the production is stored in the previous plan as the lead time. Or, the processing device 1 may shift the time of the previous plan data into the future by the amount of the lead time.

Modification

The processing device 1 may further execute third processing. In the third processing, the processing device 1 generates second prediction data based on production data. The production data is time-series data of the relationship between time and a production parameter. The production parameter includes at least one selected from the group consisting of an operation rate of equipment, an occurrence rate of discrepancies, a maintenance rate, and an occurrence rate of defective components.

When generating the plan, the change of the production parameter with respect to time also is predicted. When generating the new plan, the processing device 1 inputs the predicted production data to a second model. The second model outputs second prediction data of the relationship between time and the production volume.

The second model includes a neural network. It is favorable for the second model to include a recurrent neural network (RNN). More favorably, the RNN includes a long short term memory (LSTM) structure.

The second model is pretrained. The performance data and the previous production data predicted when generating the previous plan are used to train the second model. The previous production data is time-series data of the relationship between time and a production parameter of the previous plan. The second model uses the previous production data as input data and is trained using the performance data as teaching data. Thereby, the second model is trained to be able to predict the performance data based on the production data.

The processing device 1 stores the second prediction data in the memory device 2. The processing device 1 may output the second prediction data to the output device 4.

Figure 10:
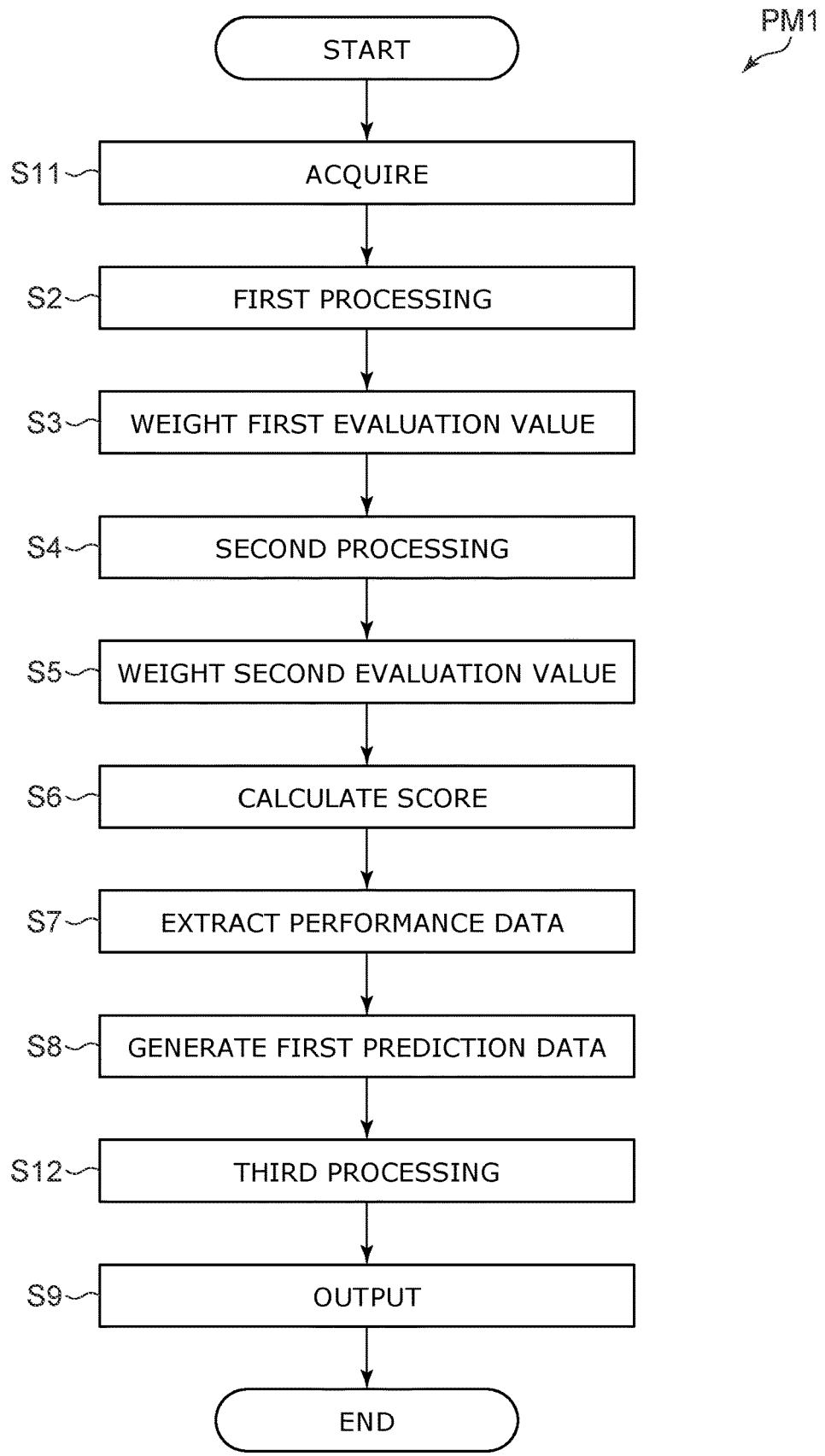
FIG. 10 is a flowchart illustrating a processing method according to the processing system according to the modification of the embodiment.

FIG. 10 is a flowchart illustrating a processing method according to the processing system according to the modification of the embodiment.

In the processing method PM1, the processing device 1 acquires the new plan data, the new plan image, and the production data (step S11). Similarly to the processing method PM0 illustrated in FIG. 8, the processing device 1 executes the first processing (step S2) and weights the first evaluation value (step S3). The processing device 1 executes the second processing (step S4) and weights the second evaluation value (step S5). The processing device 1 calculates the score (step S6), extracts the performance data (step S7), and generates the first prediction data (step S8). The processing device 1 executes the third processing (step S12). In the third processing, the processing device 1 acquires the second prediction data output from the second model. The processing device 1 outputs the data obtained by the processing (step S9).

According to the modification, the user can estimate the manufacturing capacity by referring to both the first and second prediction data. Even when a previous plan that is similar to the new plan does not exist, the user can utilize the second prediction data to predict the performance. According to the modification, the convenience of the user can be improved.

Figure 11:
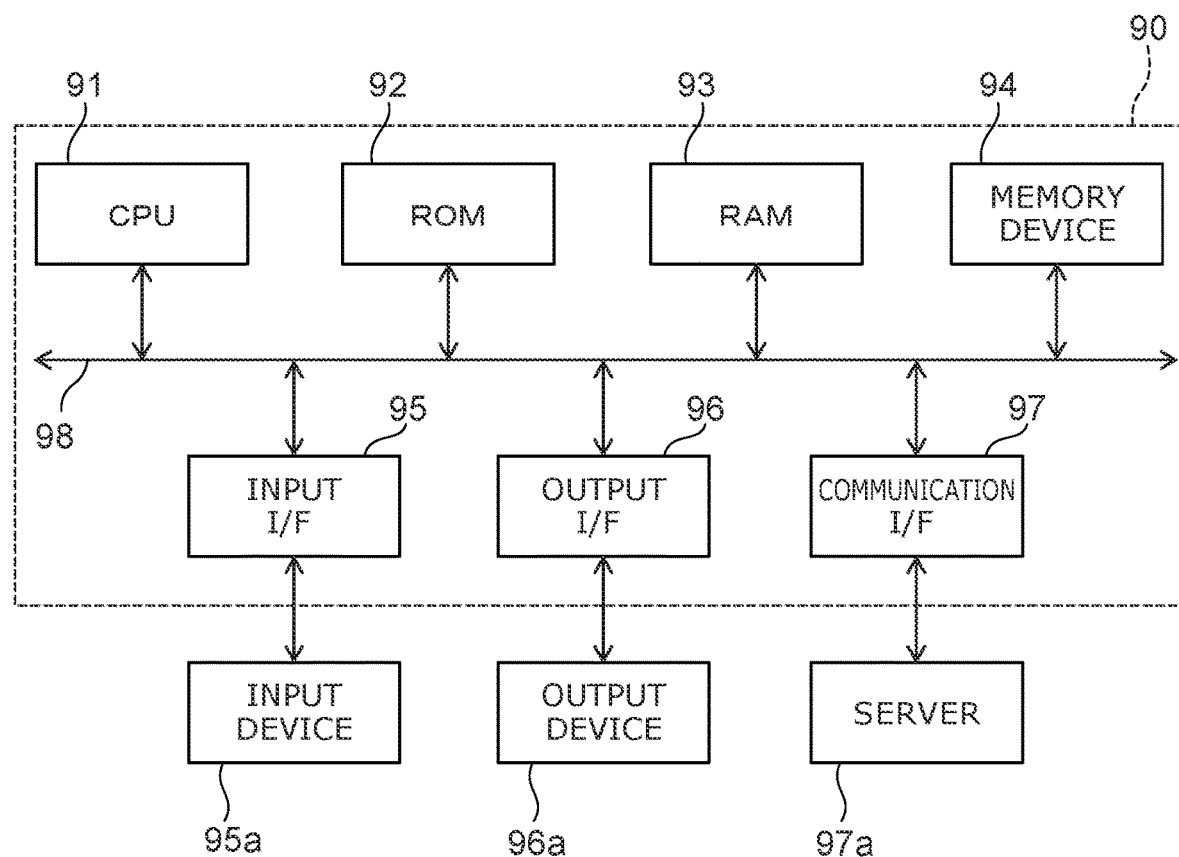
FIG. 11 is a schematic view illustrating a hardware configuration.

FIG. 11 is a schematic view illustrating a hardware configuration.

The processing system 10 according to the embodiment can be realized by the hardware configuration illustrated in FIG. 11. A computer 90 illustrated in FIG. 11 includes a CPU 91, ROM 92, RAM 93, a memory device 94, an input interface 95, an output interface 96, and a communication interface 97.

The ROM 92 stores programs that control the operations of the computer 90. A program that is necessary for causing the computer 90 to realize the processing described above is stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. While executing the program, the CPU 91 executes various processes by controlling configurations via a system bus 98.

The memory device 94 stores data necessary for executing the programs and data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit the data to the output device 96a via the output I/F 96 and can cause the output device 96a to output the data. For example, the output device 96a outputs at least one of the processing results illustrated in FIGS. 5A and 5B, FIG. 6, and FIGS. 7A and 7B.

The communication interface (I/F) 97 connects the computer 90 and a server 97a that is outside the computer 90. The communication I/F 97 is, for example, a network card such as a LAN card, etc. The CPU 91 can read various data from the server 97a via the communication I/F 97.

The memory device 94 includes not less than one selected from a hard disk drive (HDD) and a solid state drive (SSD). The input device 95a includes not less than one selected from a mouse, a keyboard, a microphone (audio input), and a touchpad. The output device 96a includes not less than one selected from a monitor, a projector, and a printer. A device such as a touch panel that functions as both the input device 95a and the output device 96a may be used.

The computer 90 functions as the processing device 1. The memory device 94 and the server 97a function as the memory device 2. The input device 95a is used as the input device 3 of the processing system 10. The output device 96a is used as the output device 4 of the processing system 10.

By using the processing device or the processing method described above, data that is useful for generating the production plan can be provided to the user. Similar effects can be obtained by using a program to cause a computer to operate as the processing device.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or a recording medium (a non-transitory computer-readable storage medium) that can be read by another nontemporary computer.

For example, information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced by combining data sets mutually.

What is claimed is:

1. A processing device, comprising a processing circuitry,
the processing circuitry referring to a plurality of data sets, each of the data sets including previous plan data and performance data, the previous plan data being of a time series of a relationship between time and a target production volume of a previous plan, the performance data being of performance with respect to the previous plan,
the processing circuitry calculating a plurality of first evaluation values for a plurality of sets of the performance data by using distances between new plan data and each of a plurality of sets of the previous plan data, the new plan data being of a time series of a relationship between time and a target production volume of a new plan, the plurality of first evaluation values being of an evaluation as a prediction of performance with respect to the new plan data,
the processing circuitry inputting a new plan image to a first model and calculating a plurality of second evaluation values for the plurality of sets of performance data by using a classification result of the new plan image output from the first model, the new plan image being of the relationship between time and the target production volume of the new plan, the plurality of second evaluation values being of an evaluation as a prediction of the performance with respect to the new plan data,
the processing circuitry extracting at least one of the plurality of sets of performance data by using the plurality of first evaluation values and the plurality of second evaluation values,
wherein
the first model includes a convolutional neural network,
the first model is trained using a value of a class as a label for each of the plurality of sets of performance data b using a previous plan image as input data, and
the previous plan image is of the relationship between time and the target production volume of the previous plan,
the processing circuitry inputs production data of the new plan to a second model, which includes a recurrent neural network (RNN), and acquires second prediction data output from the second model,
the production data is of a relationship between time and at least one production parameter selected from the group consisting of an operation rate of equipment, an occurrence rate of discrepancies, a maintenance rate, and an occurrence rate of defective components, and
the second prediction data is of a time series of a relationship between time and a production volume.

2. The device according to claim 1, wherein
the plurality of sets of performance data is time-series data of relationships between time and actual production volumes.

3. The device according to claim 2, wherein
the device generates first prediction data by using the new plan data and the extracted performance data, and
the first prediction data is of a time series of a relationship between time and a production volume.

4. The device according to claim 3, wherein
the device calculates a ratio of a total amount of the actual production volume of the extracted performance data to a total amount of the target production volume of the previous plan data forming a basis of the extracted performance data, and the device calculates the production volume of the first prediction data by multiplying the ratio by the target production volume of the new plan data.

5. The device according to claim 3, wherein
the device calculates a ratio of a production period of the extracted performance data to a production period of the previous plan data forming a basis of the extracted performance data, and the device calculates a production period of the first prediction data by multiplying the ratio by a production period of the new plan data.

6. The device according to claim 1, wherein
the distances are calculated using dynamic time warping.

7. The device according to claim 1, wherein
the classification result includes a probability of a plurality of classes into which the plurality of sets of performance data is classified, the plurality of first evaluation values is calculated based on a rank when a plurality of the distances is arranged in order from a shortest value, and the plurality of second evaluation values is calculated based on a rank when a plurality of the probabilities is arranged in order from a highest value.

8. The device according to claim 1, wherein
a plurality of weights for the plurality of sets of performance data is respectively multiplied by the plurality of first evaluation values, the plurality of weights is respectively multiplied by the plurality of second evaluation values, the at least one of the plurality of sets of performance data is extracted using the weighted plurality of first evaluation values and the weighted plurality of second evaluation values, and the plurality of weights is set based on a date of a plurality of the data sets.

9. The device according to claim 1, the processing circuitry causing a monitor to display a chart based on the extracted performance data, a first axis of the chart representing a time, a second axis of the chart representing an actual production volume, the chart including time-series data of a relationship between the time and the actual production volume.

10. A processing device, comprising a processing circuitry, the processing circuitry accepting new plan data of a time series of a relationship between time and a target production volume of a new plan, the processing circuitry displaying a first ranking based on distances between the new plan data and each of a plurality of sets of previous plan data, each of the plurality of sets of previous plan data being of a time series of a relationship between time and a target production volume of a previous plan, the first ranking being displayed by arranging not less than one of a plurality of sets of performance data, the plurality of sets of performance data being respectively of performance with respect to the plurality of sets of previous plan data, the device inputting a new plan image to a first model and displaying a second ranking based on an output result from the first model, the new plan image being of the relationship between time and the target production volume of the new plan, the second ranking being displayed by arranging not less than one of the plurality of sets of performance data, wherein the first model includes a convolutional neural network, the first model is trained using a value of a class as a label for each of the plurality of sets of performance data by using a previous plan image as input data, and the previous plan image is of the relationship between time and the target production volume of the previous plan, the processing circuitry inputs production data of the new plan to a second model, which includes a recurrent neural network (RNN), and acquires second prediction data output from the second model, the production data is of a relationship between time and at least one production parameter selected from the group consisting of an operation rate of equipment, an occurrence rate of discrepancies, a maintenance rate, and an occurrence rate of defective components, and the second prediction data is of a time series of a relationship between time and a production volume.

11. A processing method, causing a processing circuitry to
refer to a plurality of data sets, each of the data sets including previous plan data and performance data, the previous plan data being of a time series of a relationship between time and a target production volume of a previous plan, the performance data being of performance with respect to the previous plan;

calculate a plurality of first evaluation values for a plurality of sets of the performance data by using distances between new plan data and each of a plurality of sets of the previous plan data, the new plan data being of a time series of a relationship between time and a target production volume of a new plan, the plurality of first evaluation values being of an evaluation as a prediction of performance with respect to the new plan data;

input a new plan image to a first model and calculating a plurality of second evaluation values for the plurality of sets of performance data by using a classification result of the new plan image output from the first model, the new plan image being of the relationship between time and the target production volume of the new plan, the plurality of second evaluation values being of an evaluation as a prediction of the performance with respect to the new plan data; and extract at least one of the plurality of sets of performance data by using the plurality of first evaluation values and the plurality of second evaluation values, wherein the first model includes a convolutional neural network, the first model is trained using a value of a class as a label for each of the plurality of sets of performance data by using a previous plan image as input data, and the previous plan image is of the relationship between time and the target production volume of the previous plan, the processing circuitry inputs production data of the new plan to a second model, which includes a recurrent neural network (RNN), and acquires second prediction data output from the second model, the production data is of a relationship between time and at least one production parameter selected from the group consisting of an operation rate of equipment, an occurrence rate of discrepancies, a maintenance rate, and an occurrence rate of defective components, and the second prediction data is of a time series of a relationship between time and a production volume.

12. A non-transitory computer-readable storage medium storing a program,
the program causing a processing device to:
refer to a plurality of data sets, each of the data sets including previous plan data and performance data, the previous plan data being of a time series of a relationship between time and a target production volume of a previous plan, the performance data being of performance with respect to the previous plan;
calculate a plurality of first evaluation values for a plurality of sets of the performance data by using distances between new plan data and each of a plurality of sets of the previous plan data, the new plan data being of a time series of a relationship between time and a target production volume of a new plan, the plurality of first evaluation values being of an evaluation as a prediction of performance with respect to the new plan data;
input a new plan image to a first model and calculate a plurality of second evaluation values for the plurality of sets of performance data by using a classification result of the new plan image output from the first model, the new plan image being of the relationship between time and the target production volume of the new plan, the plurality of second evaluation values being of an evaluation as a prediction of the performance with respect to the new plan data; and
extract at least one of the plurality of sets of performance data by using the plurality of first evaluation values and the plurality of second evaluation values,
wherein
the first model includes a convolutional neural network,
the first model is trained using a value of a class as a label for each of the plurality of sets of performance data by using a previous plan image as input data, and
the previous plan image is of the relationship between time and the target production volume of the previous plan,
the device inputs production data of the new plan to a second model, which includes a recurrent neural network (RNN), and acquires second prediction data output from the second model,
the production data is of a relationship between time and at least one production parameter selected from the group consisting of an operation rate of equipment, an occurrence rate of discrepancies, a maintenance rate, and an occurrence rate of defective components, and
the second prediction data is of a time series of a relationship between time and a production volume.

* * * * *